United States Patent
Neuhaeuser

(10) Patent No.: US 12,388,878 B2
(45) Date of Patent: Aug. 12, 2025

(54) METHOD FOR TRANSFERRING A CALL, AND COMMUNICATION MODULE

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 463 days.

(21) Appl. No.: 17/801,502

(22) PCT Filed: Feb. 16, 2021

(86) PCT No.: PCT/DE2021/100152
§ 371 (c)(1),
(2) Date: Aug. 22, 2022

(87) PCT Pub. No.: WO2021/164825
PCT Pub. Date: Aug. 26, 2021

(65) Prior Publication Data
US 2023/0086940 A1    Mar. 23, 2023

(30) Foreign Application Priority Data
Feb. 23, 2020  (DE) .................. 10 2020 104 711.8

(51) Int. Cl.
*H04W 4/02*   (2018.01)
*G06Q 30/02*  (2023.01)
(Continued)

(52) U.S. Cl.
CPC ...... *H04L 65/1059* (2013.01); *H04L 65/1083* (2013.01); *H04L 65/1094* (2022.05); *H04W 4/16* (2013.01)

(58) Field of Classification Search
CPC .. H04W 4/16; H04L 65/1096; H04L 65/1083; H04L 65/1094; H04L 65/1059
(Continued)

(56) References Cited

U.S. PATENT DOCUMENTS 9,571,995 B1 *   2/2017   Scheer .................. H04W 4/16
11,115,803 B2    9/2021   Zhang et al.
(Continued)

FOREIGN PATENT DOCUMENTS

| DE | 101 27 265 A1 | 4/2002 |
| DE | 11 2018 005 558 T5 | 6/2020 |
| WO | WO 2019/094799 A1 | 5/2019 |

OTHER PUBLICATIONS

IP.com search history (Year: 2025).*
(Continued)

*Primary Examiner* — Moustapha Diaby
(74) *Attorney, Agent, or Firm* — Crowell & Moring LLP

(57) ABSTRACT

A method for transferring a call, including: receiving an instruction to transfer a call from a first communication module to a second communication module of a mobile terminal, wherein the first communication module is connected via a wireless near-field connection to the mobile terminal, and wherein the first communication module has a first communication profile of a user, and the second communication module has a second communication profile of the user; deactivating the wireless near-field connection; and transferring the call from the first communication module to the second communication module of the mobile terminal.

10 Claims, 2 Drawing Sheets

(51) Int. Cl.
*H04L 65/1059* (2022.01)
*H04L 65/1083* (2022.01)
*H04L 65/1094* (2022.01)
*H04W 4/16* (2009.01)
*H04W 8/18* (2009.01)

(58) Field of Classification Search
USPC .................................................... 455/414.1
See application file for complete search history.

(56) References Cited

U.S. PATENT DOCUMENTS

2011/0142214 A1* 6/2011 Kennedy ........... H04M 1/72457
  379/93.17
2017/0064495 A1* 3/2017 Toya ....................... H04W 4/80
2017/0244837 A1* 8/2017 Kim .................. H04M 1/72409

OTHER PUBLICATIONS

ProQuest search history (Year: 2025).*
PCT/DE2021/100152, International Search Report dated May 11, 2021 (Two (2) pages).
German-language German Office Action issued in German application No. 10 2020 104 711.8 dated Oct. 19, 2020 (Five (5) pages).

* cited by examiner

METHOD FOR TRANSFERRING A CALL, AND COMMUNICATION MODULE

BACKGROUND AND SUMMARY OF THE INVENTION

The present disclosure relates to a method for transferring a call, a storage medium for carrying out the method, a communication module, and a means of transport having a communication module of this type. The present disclosure relates, in particular, to a call transfer between two communication modules to which the same call number is assigned.

PRIOR ART

The networking of modern vehicles, for example with the Internet, is becoming increasingly important. Cloud-based services, for example, can be made available to the user in the vehicle. In order to be able to use these and other services, the vehicle comprises a communication module which uses, for example, a SIM.

A mobile device of the user can further have a wired or wireless connection to the vehicle. If the user leaves the vehicle while a call is active in the vehicle, the user may wish to transfer the call to his mobile device. This can cause inconvenience for the user.

An object of the present disclosure is to indicate a method for transferring a call, a storage medium to carry out the method, a communication module, and a means of transport having a communication module of this type which enable an efficient transfer of calls between two communication modules. Another object of the present disclosure is further to improve user-friendliness in the transfer of calls between two communication modules.

According to at least one embodiment, a method is indicated for transferring a call, in particular from a means of transport to a mobile terminal. The method comprises: receiving an instruction to transfer a call from a first communication module to a second communication module of a mobile terminal, wherein the first communication module is connected via a wireless near-field connection to the mobile terminal or to the second communication module of the mobile terminal, and wherein the first communication module has a first communication profile of a user, and the second communication module has a second communication profile of the user; deactivating the wireless near-field connection; and transferring the call from the first communication module to the second communication module of the mobile terminal.

The first communication module can be implemented in a means of transport and, in particular, in a vehicle.

If, for example, the user leaves his vehicle and is currently making a call with an eSIM of the vehicle, the user must transfer the call to his cell phone, or the user must remain in the vehicle. The cell phone is often connected to the vehicle via Bluetooth. The same call number can be assigned to the eSIM and to the cell phone. When the call is transferred from the vehicle to the cell phone, all devices of the user are signaled with the same call number. As a result, all devices in the account of the user ring, i.e. the vehicle and the cell phone (and possibly further devices). The cell phone which is connected to the vehicle via Bluetooth would then ring in the vehicle and would, for example, be displayed in the head unit. This can confuse the user and can also result in problems inside the vehicle.

According to at least one embodiment, the near-field connection is temporarily released when the call transfer (call handover) is triggered by the user in the vehicle. It is thus possible to ensure that the incoming call is not superimposed on the still-existing eSIM call in the vehicle.

The first communication module and/or the second communication module are preferably configured to communicate wirelessly in a mobile network. The first communication module and/or the second communication module can be configured, for example, for communication according to the LTE (Long-Term Evolution) standard and/or the 5G standard. Communication via further present or future communication technologies is possible. However, the present disclosure is not limited to mobile radiocommunication standards, and non-mobile radiocommunication standards can be used.

The term mobile device includes, in particular, smart phones, but also other cell phones, Personal Digital Assistants (PDAs), Tablet PCs, watches (smart watches) and all present and future electronic devices which are equipped with a technology for loading and executing apps.

The first communication profile is preferably a first eSIM profile, and the second communication profile is a second eSIM profile. However, the present disclosure is not limited thereto and other communication profiles can be used, such as conventional SIM profiles or future communication profiles.

The SIM or eSIM (embedded subscriber identity module) is a standardized method for securely embedding subscriber information in a module of a device for telecommunication. Security or data confidentiality is crucial for communication by means of the eSIM. The module contains a standardized digital certificate for this purpose. A multiplicity of different certificates exist worldwide, wherein a specific type of eSIM functions only with a specific type of certificate.

The first communication profile and/or the second communication profile can be provided by a communication service provider and, in particular, by a Mobile Network Operator (MNO). The communication service provider can, for example, enable communication in a mobile network according to the LTE (Long-Term Evolution) standard and/or the 5G standard.

The same call number is preferably assigned to the first communication profile and to the second communication profile. The term "call number" refers here to a digit sequence for dialing a destination subscriber when making a telephone call.

Receiving an instruction to transfer a call from a first communication module to a second communication module of the mobile terminal preferably comprises receiving a user input by the user. The user input can take place, for example, in the vehicle or in the mobile terminal.

The vehicle comprises, for example, an input unit, such as, for example, a touch-sensitive screen of an infotainment system. In a further example, the input unit can be configured for voice input. However, the present disclosure is not limited thereto and the input unit can comprise touch-sensitive and/or mechanical buttons or switches. The input unit can, for example, be present on a central console of the vehicle.

In a further example, the mobile terminal comprises the input unit. The input unit is preferably provided by a touch-sensitive screen of the mobile terminal.

The wireless near-field connection is preferably a Bluetooth connection. However, the present disclosure is not limited thereto and other wireless near-field connections which enable a connection between the vehicle and the mobile terminal can be used.

The wireless near-field connection is preferably deactivated for a predetermined time period t. When the predetermined time period has elapsed, the wireless near-field connection between the vehicle and the mobile terminal can be restored. In some embodiments, the predetermined time period t can be less than 10 seconds, and preferably less than 5 seconds.

According to at least one embodiment, a software (SW) program is indicated. The SW program can be configured to be executed on one or more processors in order to carry out the call transfer method described in this document.

According to at least one embodiment, a storage medium is indicated. The storage medium can comprise an SW program which is configured to be executed on one or more processors and thereby carry out the call transfer method described in this document.

According to at least one embodiment, a (first) communication module is indicated. The communication module comprises one or more processors which are configured: to receive an instruction to transfer a call from the communication module to another communication module of a mobile terminal, wherein the communication module is connected via a wireless near-field connection to the other communication module, and wherein the communication module has a first communication profile of a user, and the other communication module of the mobile terminal has a second communication profile of the user; to deactivate the wireless near-field connection; and to transfer the call to the other communication module of the mobile terminal.

The communication module can be configured for communication according to the LTE (Long-Term Evolution) standard and/or the 5G standard.

According to at least one embodiment, a means of transport is indicated, comprising the (first) communication module according to the embodiments of the present disclosure.

The means of transport is preferably a vehicle and, in particular, a motor vehicle. The means of transport can be a vehicle (e.g. a motor vehicle), a ship or an aircraft (e.g. a drone for passenger transport), but is not limited thereto. The term vehicle comprises passenger vehicles, trucks, buses, mobile homes, motorcycles, etc., which serve to transport passengers, goods, etc. In particular, the term comprises motor vehicles for passenger transport.

Exemplary embodiments of the disclosure are shown in the figures and are described in detail below, wherein:

BRIEF DESCRIPTION OF THE DRAWINGS

Unless otherwise indicated, the same reference numbers are used below for identical and identically functioning elements.

DETAILED DESCRIPTION OF THE DRAWINGS

Figure 1:
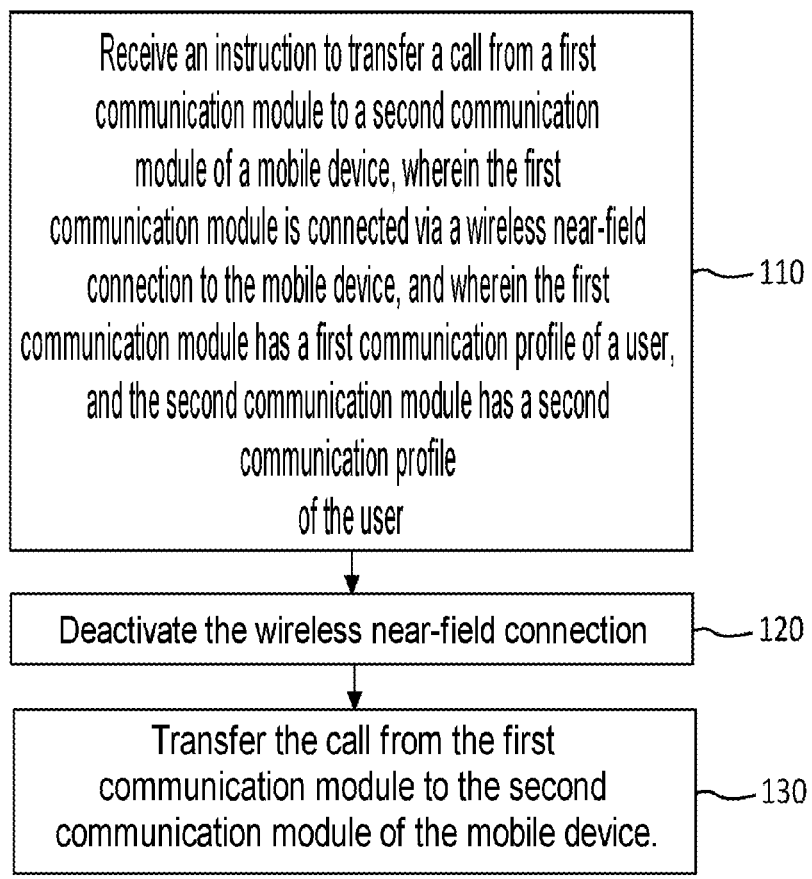
FIG. 1 shows a flow diagram of a method for transferring a call according to embodiments of the present disclosure.
Figure 2:
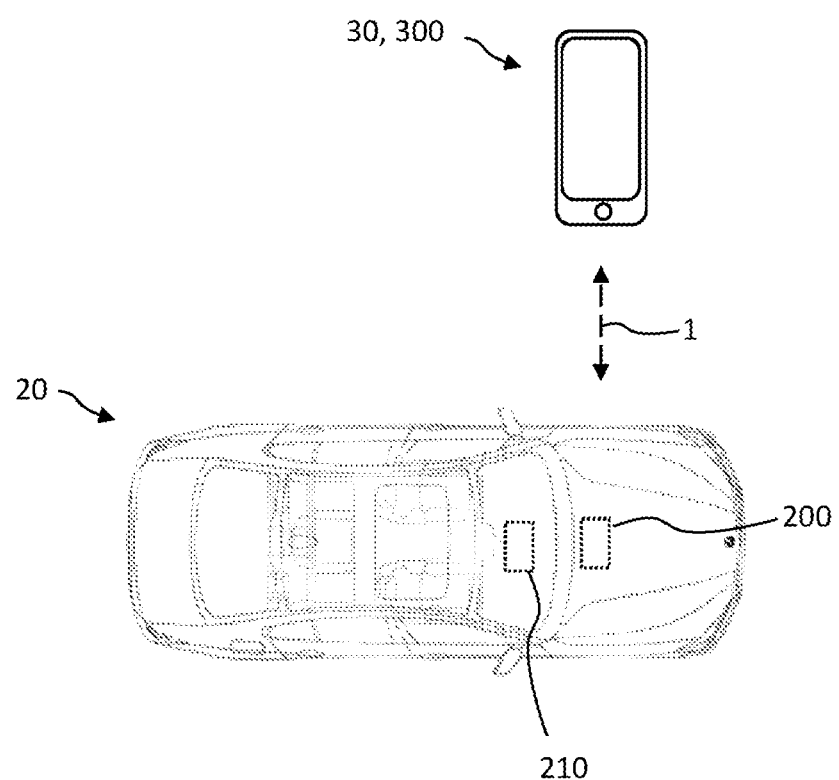
FIG. 2 shows schematically a means of transport and a mobile terminal according to embodiments of the present disclosure.

FIG. 1 shows a flow diagram of a method 100 for transferring a call according to embodiments of the present disclosure. FIG. 2 shows schematically a means of transport 20 and a mobile terminal 30 according to embodiments of the present disclosure. In some embodiments, the means of transport 20 is a vehicle and, in particular, a motor vehicle.

The method 100 comprises, in block 110, receiving an instruction to transfer a call from a first communication module 200 to a second communication module 300 of a mobile terminal 30, wherein the first communication module 200 is connected via a wireless near-field connection 1 to the mobile terminal 30 or to the second communication module 300 of the mobile terminal 30, and wherein the first communication module 200 has a first communication profile of a user, and the second communication module 300 has a second communication profile of the user; deactivating the wireless near-field connection 1; and transferring the call from the first communication module 200 to the second communication module 300 of the mobile terminal 30. The wireless near-field connection 1 is typically a Bluetooth connection.

The method 100 can be implemented by corresponding software which is executable by one or more processors (e.g. a CPU).

According to the embodiments of the present disclosure, the near-field connection is temporarily released when the call transfer (call handover) is triggered by the user in the vehicle. It can thus be ensured that the incoming call is not superimposed in the vehicle on the still-existing call.

In the example shown in FIG. 2, the first communication module 200 is implemented in the vehicle 20, and the second communication module 300 is implemented in the mobile terminal 30.

The first communication module 200 and/or the second communication module 300 can be configured to communicate wirelessly in a mobile network. The first communication module 200 and/or the second communication module 300 can be configured, for example, for communication according to the LTE (Long-Term Evolution) standard and/or the 5G standard.

In some embodiments, the first communication profile is a first eSIM profile, and the second communication profile is a second eSIM profile. The SIM or eSIM (embedded subscriber identity module) is a standardized method for securely embedding subscriber information in a module of a device for telecommunication.

The first communication profile and/or the second communication profile can be provided by a communication service provider and, in particular, by a Mobile Network Operator (MNO). The communication service provider can, for example, enable communication in a mobile network according to the LTE (Long-Term Evolution) standard and/or the 5G standard.

The same call number is typically assigned to the first communication profile and to the second communication profile. The term "call number" refers here to a digit sequence for dialing a destination subscriber when making a telephone call.

In some embodiments, receiving an instruction to transfer a call from a first communication module 200 to a second communication module 300 of the mobile terminal 30 comprises receiving a user input by the user. The user input can take place, for example, in the vehicle 20 or in the mobile terminal 30.

The vehicle 20 comprises, for example, an input unit 210, such as, for example, a touch-sensitive screen of an infotainment system. In a further example, the input unit 210 can be configured for voice input. However, the present disclosure is not limited thereto and the input unit 210 can comprise touch-sensitive and/or mechanical buttons or switches. The input unit can, for example, be present on a central console of the vehicle.

In a further example, the mobile terminal 30 comprises the input unit. The input unit is preferably provided by a touch-sensitive screen of the mobile terminal 30.

In some embodiments, the wireless near-field connection 1 is preferably deactivated for a predetermined time period t. When the predetermined time period t has elapsed, the wireless near-field connection between the vehicle 20 and the mobile terminal 30 can be restored. In some embodiments, the predetermined time period t can be less than 10 seconds, and preferably less than 5 seconds According to the invention, the near-field connection is temporarily released when the call transfer (call handover) is triggered by the user in the vehicle. It is thus possible to ensure that the incoming call is not superimposed on the still-existing eSIM call in the vehicle.

Although the invention has been illustrated and explained in detail through preferred exemplary embodiments, the invention is not restricted by the disclosed examples, and other variations can be derived therefrom by the person skilled in the art without departing the protective scope of the invention. It is therefore clear that a multiplicity of possible variations exist. It is similarly clear that embodiments cited by way of example in effect represent examples only which are not to be interpreted in any way as limiting e.g. the scope of protection of the possible applications or the configuration of the invention. The preceding description and the description of the figures instead enable the person skilled in the art to implement the exemplary embodiments in concrete form, wherein the person skilled in the art, with knowledge of the disclosed inventive concept, can perform a wide variety of modifications, for example in respect of the function or the arrangement of individual elements specified in an exemplary embodiment, without departing the protective scope which is defined by the claims and their legal equivalents, such as more detailed explanations in the description.

The invention claimed is:

1. A method for transferring a call, comprising:
receiving an instruction to transfer a call from a first communication module to a second communication module of a mobile terminal, wherein the first communication module is connected via a wireless near-field connection to the mobile terminal, and wherein the first communication module has a first communication profile of a user, and the second communication module has a second communication profile of the user;
deactivating the wireless near-field connection; and
transferring the call from the first communication module to the second communication module of the mobile terminal.

2. The method of claim 1, wherein the first communication profile is a first eSIM profile, and the second communication profile is a second eSIM profile.

3. The method of claim 1, wherein the same call number is assigned to the first communication profile and to the second communication profile.

4. The method of claim 1, wherein receiving the instruction to transfer the call from the first communication module to the second communication module of the mobile terminal preferably includes: receiving a user input by the user.

5. The method of claim 1, wherein the wireless near-field connection is a Bluetooth connection.

6. The method of claim 1, wherein the wireless near-field connection is deactivated for a predetermined time period.

7. The method of claim 1, wherein the first communication module is implemented in a means of transport.

8. A non-transitory computer-readable storage medium storing a software program that, when executed by a computer, causes the computer to carry out the method of claim 1.

9. A communication module, comprising:
a processor; and
a memory storing software that, when executed by the processor, configures the processor to control the communication module so as to:
receive an instruction to transfer a call from the communication module to another communication module of a mobile terminal, wherein the communication module is connected via a wireless near-field connection to the other communication module of the mobile terminal, and wherein the communication module has a first communication profile of a user, and the other communication module of the mobile terminal as a second communication profile of the user;
deactivate the wireless near-field connection; and
transfer the call to the other communication module of the mobile terminal.

10. A vehicle comprising the communication module of claim 9.

* * * * *